United States Patent

Sasaki et al.

[11] Patent Number: 6,013,977
[45] Date of Patent: Jan. 11, 2000

[54] GLASS SUPPORTING MEMBER FOR AN ELECTRON GUN AND METHOD FOR ITS PRODUCTION

[75] Inventors: Mikio Sasaki; Akira Fujinami; Koji Okita; Shiro Asai, all of Funabashi, Japan

[73] Assignee: Asahi Glass Company Ltd., Tokyo, Japan

[21] Appl. No.: 08/997,257

[22] Filed: Dec. 23, 1997

[30] Foreign Application Priority Data

Dec. 25, 1996 [JP] Japan ................................. 8-355790
Oct. 2, 1997 [JP] Japan ................................. 9-284285

[51] Int. Cl.$^7$ ........................ H01J 9/02; C03C 3/087
[52] U.S. Cl. ..................... 313/417; 313/438; 313/456; 501/69; 501/70
[58] Field of Search ........................ 313/417, 243, 313/456, 467, 438; 501/69, 70; 445/34

[56] References Cited

U.S. PATENT DOCUMENTS

| 3,936,692 | 2/1976 | Izumida et al. | 313/414 |
| 4,106,946 | 8/1978 | Ritze | 501/69 |
| 4,738,938 | 4/1988 | Kunkle et al. | 501/70 |

*Primary Examiner*—Vip Patel
*Assistant Examiner*—Joseph Williams
*Attorney, Agent, or Firm*—Oblon, Spivak, McClelland, Maier & Neustadt, P.C.

[57] ABSTRACT

A supporting member for an electron gun, which is molded and processed from a composition comprising a glass component and an additive, wherein the additive is a material which does not decompose in a temperature range for the molding and processing and which decomposes and evaporates for the first time in the temperature range for embedding an electrode metal in the surface of the supporting member.

9 Claims, No Drawings

GLASS SUPPORTING MEMBER FOR AN ELECTRON GUN AND METHOD FOR ITS PRODUCTION

BACKGROUND OF THE INVENTION

1. Field of the Invention

The present invention relates to a supporting member for an electron gun of a cathode ray tube and a method for its production.

2. Discussion of Background

The supporting member for an electron gun is used for insulating and fixing a metal electrode constituting an electron gun of a cathode ray tube. The surface of the supporting member is heated and melted by e.g. a gas burner, and the leg portion of a metal electrode is embedded into the supporting member to a predetermined depth and then fixed by cooling. This process step is called a beading step. The heating temperature of the surface of the supporting member required for this beading step is usually from 1200 to 1500° C. Here, in order to embed the leg portion of the electron gun into the supporting member to a desired depth in a predetermined time, complex adjustment of the air/fuel ratio in the gas or the gas flow rate, is required.

Different electron guns are used by different manufacturers of cathode ray tubes or for different types of cathode ray tubes. Such electron guns have different electrode layouts or different electrode structures. Accordingly, it is desired that supporting members for electron guns can be molded and produced in various shapes easily and with high precision. Further, in order to prevent overheating of the entire supporting member and to heat only the surface layer at a high temperature while maintaining the dimensional precision of the supporting member during the beading step, it is necessary to introduce fine foam into the supporting member.

The supporting member is usually prepared in such a manner that glass as the starting material is not directly press-molded but it is once pulverized into a fine powder, and the glass powder thus obtained is mixed with a binder for molding and then pressed in a mold, followed by baking and sintering.

A solvent may sometimes be used to mix the fine glass powder and the binder efficiently and uniformly. In such a case, the fine glass powder is used in the form of a slurry. The solvent may, for example, be water or an alcohol, or an organic polar solvent such as a ketone may also be used.

In the beading step, an electrode metal is penetrated to a predetermined depth into the supporting member in a predetermined time. Accordingly, it is desired that the surface of the supporting member is rapidly heated to reduce the viscosity of the surface of the supporting member. To meet such a requirement, the heating power of the burner for heating may finely be adjusted to meet the beading time prescribed by a throughput for assembling the electron gun. However, there has been a drawback such that a local deformation of the supporting member is likely to form due to excess heating by the burner, or the job change for every different type is extremely cumbersome.

On the other hand, it is conceivable that while the heating condition by the burner is fixed, supporting members having different compositions may be prepared for the respective different types. However, such is not practical, since the physical properties such as the heat expansion coefficients will be different from one type to another.

SUMMARY OF THE INVENTION

The present invention has been made to solve such problems, and it is an object of the present invention to provide a supporting member for an electron gun of which the surface can be heated to a predetermined temperature in a predetermined time without requiring a change in the combustion condition of the gas burner or without a change in the composition of main components for supporting members from one type to another of cathode ray tubes in the beading step of a supporting member for an electron gun, and a method for its production.

The present inventors have conducted an extensive study to accomplish the above objects and as a result, have found that by producing a supporting member by adding a very small amount of a component which does not decompose in the temperature range for molding and baking the supporting member and which decomposes and evaporates only when the supporting member reaches the temperature range for beading, to the slurry of the fine powder of the starting material glass, it is possible to form a dense foam layer in the vicinity of the surface of the supporting member and to readily control the temperature rise of the surface of the supporting member during beading of the supporting member, and whereby precise insertion of the electrode metal is made possible. The present invention has been accomplished on the basis of this discovery.

Thus, the present invention provides a supporting member for an electron gun, which is molded and processed from a composition comprising a glass component and an additive, wherein the additive is a material which does not decompose in a temperature range for the molding and processing and which decomposes and evaporates for the first time in the temperature range for embedding an electrode metal in the surface of the supporting member.

Further, the present invention provides a method for producing a supporting member for an electron gun, which comprises molding and baking a slurry prepared by mixing a fine powder of a borosilicate glass comprising from 59 to 90 wt % of silicon oxide, from 9 to 40 wt % of boron oxide and from 1 to 10 wt % of potassium oxide, and a binder in a solvent, wherein the slurry contains an alkaline earth metal sulfate in an amount of from 30 to 350 ppm by weight based on the fine glass powder.

DETAILED DESCRIPTION OF THE PREFERRED EMBODIMENTS

Now, the present invention will be described in further detail with reference to the preferred embodiments of the present invention.

The glass for forming the supporting member of an electron gun of the present invention is a borosilicate glass prepared by a conventional method, which comprises from 59 to 90 wt % of silicon oxide, from 9 to 40 wt % of boron oxide and from 1 to 10 wt % of potassium oxide. A conventional supporting member for an electron gun is prepared in such a manner that this borosilicate glass is once finely pulverized, the powder thereby obtained is mixed with an organic binder and a solvent to obtain a slurry, then, this slurry is granulated and dried, and then molded into a predetermined shape by a press molding machine, followed by baking and sintering. The supporting member of the present invention is produced basically in the same manner as the conventional technique.

In the present invention, to produce the supporting member for an electron gun, firstly a borosilicate glass comprising the above components, is prepared by a conventional method, and it is pulverized by a conventional pulverization method usually to a fine powder of from 1 to 50 μm, to obtain a fine starting material glass powder. Then, this fine starting material glass powder is formed into a slurry.

To form the slurry, a binder is used together with the fine starting material glass powder. As the binder, an organic binder such as polyethylene glycol (PEG), polyvinyl alcohol (PVA), a cellulose or corn starch, may be used. PEG is the most preferred binder because the granulation properties and the moldability for molding are good and water can be used as the solvent. The amount of the binder is not particularly limited, but it is used usually in an amount of from about 3 to 10 parts by weight, per 100 parts by weight of the fine starting material glass powder.

As the solvent for forming the slurry, water, an alcohol, a ketone or other organic polar solvent may usually be employed. However, water is preferred from the viewpoint of non-flamability, working efficiency and waste treatment. Such a solvent is used usually in such an amount that the solid content of the slurry would be usually from 40 to 60 wt %. Slurrying of the fine starting material glass powder can be carried out by a conventional method and is not particularly limited.

The features of the present invention reside in the type and the amount of the additive to be added to the solvent such as water or to the slurry of the fine starting material glass powder, whereby it becomes possible to control the temperature of the surface of the supporting member during beading.

Generally speaking, such an additive is a material which forms a dense foam layer having a foam density of from 1.5 to 3 times that of the cross sectional center portion of the member in a predetermined depth from the surface of the member heated at the time when the surface of the supporting member is rapidly heated to 1300° C. at a heating rate of from 100 to 110° C./sec. by a gas/oxygen mixed burner.

Specifically, such an additive may, for example, be an alkali metal sulfate such as sodium sulfate or potassium sulfate, an alkaline earth metal sulfate such as magnesium sulfate, calcium sulfate or strontium sulfate, or an alkali metal double sulfate such as sodium aluminum sulfate or potassium aluminum sulfate.

Among the above additives, it is particularly preferred to use an alkaline earth metal sulfate, especially calcium sulfate, from the viewpoint of the storage stability in air, the solubility in water and the decomposition temperature of the salt being in the vicinity of 1300° C. required for beading. When an alkaline earth metal sulfate is used, an alkali metal sulfate and/or an alkali metal double sulfate may be used in combination. The present invention will hereinafter be described with reference to an alkaline earth metal sulfate as a typical example of the additive. However, it should be understood that the present invention is by no means restricted to use of such an alkaline earth metal sulfate.

The alkaline earth metal sulfate is preferably added in an amount of from 30 to 350 ppm by weight based on the fine glass powder in the slurry. If the amount is less than 30 ppm, the temperature control during beading tends to be difficult. On the other hand, if the amount exceeds 350 ppm, no additional effect can be expected. A more preferred amount is from 35 to 200 ppm. When the fine starting material glass powder is formed into a slurry, such a sulfate may preliminarily be dissolved in a solvent such as water to be used, or it may be added directly or as dissolved in a solvent during or after formation of the slurry. The method for its addition is not particularly limited.

Then, the obtained slurry of the fine starting material glass powder may, as it is, be molded depending upon the concentration of the solid content. Usually, however, it is subjected to granulation treatment so that molding of the powder will be facilitated. As the granulation method of the slurry, tumbling granulation, spraying granulation or agitation granulation may, for example, be employed. However, a spraying granulation method is preferred, since the packing property of the granulated product during molding of the powder can easily be controlled, and it is suitable for quality control of the granulated product. The slurry is granulated usually to a particle size of from 0.05 to 0.5 mm.

The supporting member of an electron gun of the present invention is produced by molding the fine starting material glass powder granulated as described above into a predetermined shape by press molding employing a mold, followed by baking and sintering usually at a temperature of from 700 to 1000° C.

The resulting supporting member usually contains many fine bubbles having diameters of from 0.01 to 0.05 $\mu$m uniformly in the cross sectional direction of the supporting member. However, when the surface of the supporting member is re-melted under heating by a burner during beading, fine bubbles at the surface of the supporting member dissipate out of the system, whereby a layer having a small foam density will be formed at the surface of the supporting member.

With a conventional supporting member, once bubbles disappear as mentioned above, the thermal conductivity of glass of the supporting member increases at such a portion, whereby the heat energy applied by the burner readily diffuses in the thickness direction of the supporting member, and the temperature rising rate at the surface of the supporting material gradually decreases. Accordingly, it becomes difficult to secure a predetermined final temperature and temperature-rising rate at the surface of the supporting member where an electrode metal of an electron gun is to be embedded.

Whereas, when the supporting member of the present invention is subjected to beading, although bubbles present in the surface layer of the supporting member will diminish, numerous fine bubbles will be formed afresh beneath the diminished bubble layer in a predetermined depth from the surface of the supporting member as the alkaline earth metal sulfate remaining as added to the slurry of the fine starting material glass powder to the supporting member of the present invention, undergoes heat decomposition under heating by a burner, whereby a thermal insulating property will be obtained. At the same time, the radiation heat from the burner is reflected by this foam layer thus formed, whereby a remarkable improvement in the temperature-rising rate is possible as compared with the conventional supporting member having no such a sulfate incorporated. Further, by adjusting the amount of the sulfate, it is possible to realize a desired temperature-rising rate and a desired final temperature.

To obtain the above mentioned effects, the amount of the alkaline earth metal sulfate remaining in the supporting member of the present invention is preferably within a range of from 9 to 100 ppm by weight, as calculated as the alkaline earth metal, and within a range of from 7 to 80 ppm by weight, as calculated as sulfur. More preferably, they are from 10 to 60 ppm and from 8 to 50 ppm, respectively.

So long as a dense foam layer can be formed in a predetermined depth from the surface of the supporting member under heating by a burner, a granulation or glass molding method may be employed by an addition of an additive other than the above mentioned alkaline earth metal sulfate.

Thus, with the supporting member for an electron gun of the present invention, it is made possible to control the processing speed for beading without changing the main glass components thereof. Further, since the foam layer formed at the surface of the supporting member by the beading operation, serves as an insulating layer or a reflective layer for radiation heat, only the surface layer of the supporting member where the metal electrode is to be inserted, is effectively heated and melted, whereby beading can be completed without impairing the dimensional precision of the entire supporting member.

Now, the present invention will be described in further detail with reference to Examples and Comparative Examples. However, it should be understood that the present invention is by no means restricted to such specific Examples.

EXAMPLE 1

A glass having a composition comprising 18 wt % of boron oxide, 80 wt % of silicon oxide and 2 wt % of potassium oxide, was melted and pulverized to obtain a fine glass powder having an average particle size of 10 μm. Then, 10 kg of the fine glass powder, 0.5 kg of PEG and 0.7 g of calcium sulfate (i.e. 70 ppm based on the fine glass powder) were added to 10 kg of water, followed by mixing and stirring to obtain a slurry. This slurry was dried by a spray drier to obtain a granulated powder having an average particle size of 0.2 mm, which was then press-molded, followed by baking at 900° C. for one hour, to obtain a supporting member (thickness: 4 mm, width: 10 mm, length: 50 mm) having a single body weight of 3 g. The calcium content in the supporting member was 20 ppm and the sulfur content was 16 ppm. Further, microscopic observation of the supporting member thus prepared was carried out from the cross sectional direction with 30 magnifications, whereby the foam density at the cross sectional center portion of the supporting member was counted and found to be 310 bubbles/mm$^2$.

Then, the surface of the supporting member was baked for 15 seconds at a heating rate of 108° C./sec. by a gas/oxygen mixed burner, whereby the surface temperature of the supporting member was measured by a radiation thermometer and found to be 1350° C. which is suitable for beading operation. At that time, the supporting member after heating was microscopically observed from the cross sectional direction, whereby it was confirmed that a dense foam layer was formed in a depth of about 1 mm from the surface of the supporting member. With 30 magnifications, the foam density of the region in a depth of about 1 mm from the surface of the supporting member was counted and found to be 750 bubbles/mm$^2$.

Further, the surface of a supporting member prepared in the same manner as above, was baked by the above burner, and while monitoring the surface temperature by a radiation thermometer, the time until the temperature reached 1250° C., was measured and found to be 11.5 seconds, which is suitable for beading operation.

EXAMPLE 2

A supporting member having a single body weight of 3 g was prepared in the same manner as in Example 1 except that the amount of calcium sulfate was changed to 0.35 g (i.e. 35 ppm based on the fine glass powder). The calcium content in the supporting member was 10 ppm, and the sulfur content was 8 ppm. Further, the foam density at the cross sectional center of the supporting member was 321 bubbles/mm$^2$.

Then, the surface of the supporting member was baked for 15 seconds by the same gas/oxygen mixed burner as used in Example 1, and the surface temperature of the supporting member was measured by a radiation thermometer and found to be 1300° C. At that time, the supporting member after heating was microscopically observed from the cross sectional direction, whereby it was confirmed that a dense foam layer similar to the one in Example 1 was formed, and the foam density was 520 bubbles/mm$^2$.

COMPARATIVE EXAMPLE 1

A supporting member having a single body weight of 3 g was prepared in the same manner as in Example 1 except that no calcium sulfate was used. The foam density at the cross sectional center of this supporting member was 310 bubbles/mm$^2$. Then, the surface of the supporting member was baked for 15 seconds by the same gas/oxygen mixed burner as used in Example 1, and the surface temperature of the supporting member was measured by a radiation thermometer and found to be 1260° C., which was lower by 90° C. than the optimum temperature for beading operation. At that time, the supporting member after heating was microscopically observed from the cross sectional direction, whereby it was found that a dense foam layer as observed in Example 1, was not formed. The foam density was counted in the same manner as in Example 1 and found to be 330 bubbles/mm$^2$.

Further, the surface of a supporting member prepared in the same manner as above, was baked by the above gas/oxygen mixed burner, and while monitoring the surface temperature of the supporting member by a radiation thermometer, the time until the temperature reached 1250° C., was measured and found to be 14.5 seconds, which was slower by 3 seconds as compared with Example 1.

COMPARATIVE EXAMPLE 2

A supporting member having a single body weight of 3 g was prepared in the same manner as in Example 1 except that 0.7 g of calcium hydroxide was used instead of calcium sulfate. The foam density at the cross sectional center of the supporting member was 330 bubbles/mm$^2$.

Then, the surface of the supporting member was baked for 15 seconds by the same gas/oxygen mixed burner as used in Example 1, and the surface temperature of the supporting member was measured by a radiation thermometer and found to be 1260° C. Thus, as in Comparative Example 1, the optimum temperature for beading operation was not obtained. Further, at that time, the supporting member after heating was microscopically observed from the cross sectional direction, whereby it was found that as in Comparative Example 1, a dense foam layer was not formed, and the foam density was counted and found to be 308 bubbles/mm$^2$.

By using the supporting member for an electron gun of the present invention and the method for its production, it is possible to raise the surface temperature of the supporting member to a higher temperature in predetermined time in the beading step, whereby the time required for heating for embedding an electrode metal into the surface of the supporting member, can be shortened.

At that time, only the vicinity of the surface of the supporting member is selectively heated and melted by the function of a foam layer thereby formed, whereby the dimensional precision of the entire supporting member will be maintained. Further, by changing the amount of the sulfate to be added to the slurry, it is possible to design the above heating time and the surface temperature to have desired levels.

What is claimed is:

1. A supporting member for an electron gun, which is molded and processed from a composition comprising a glass component and an additive, wherein the additive is a material which does not decompose in a temperature range for the molding and processing and which decomposes and evaporates for the first time in the temperature range for embedding an electrode metal in the surface of the supporting member.

2. The supporting member for an electron gun according to claim 1, wherein the additive is a material which forms a dense foam layer having a foam density of from 1.5 to 3 times that of a cross sectional center portion of the member, at an interior distanced from the surface of the member heated at the time when the surface of the supporting member is rapidly heated to 1300° C. at a heating rate of from 100 to 110° C./sec. by a gas/oxygen mixed burner.

3. The supporting member for an electron gun according to claim 1, wherein the glass component is a borosilicate glass, and the additive is a metal sulfate.

4. The supporting member for an electron gun according to claim 1, wherein the glass is a borosilicate glass comprising from 59 to 90 wt % of silicon oxide, from 9 to 40 wt % of boron oxide and from 1 to 10 wt % of potassium oxide, and, as the additive, an alkaline earth metal is from 9 to 100 ppm by weight, and sulfur is from 7 to 80 ppm by weight.

5. The supporting member for an electron gun according to claim 4, wherein the alkaline earth metal is calcium.

6. The supporting member for an electron gun according to claim 1, wherein the glass is a borosilicate glass comprising from 59 to 90 wt % of silicon oxide, from 9 to 40 wt % of boron oxide and from 1 to 10 wt % of potassium oxide, and, as the additive, an alkaline earth metal is from 10 to 60 ppm by weight, and sulfur is from 8 to 50 ppm by weight.

7. The supporting member for an electron gun according to claim 6, wherein the alkaline earth metal is calcium.

8. A method for producing a supporting member for an electron gun, which comprises molding and baking a slurry prepared by mixing a fine powder of a borosilicate glass comprising from 59 to 90 wt % of silicon oxide, from 9 to 40 wt % of boron oxide and from 1 to 10 wt % of potassium oxide, and a binder in a solvent, wherein the slurry contains an alkaline earth metal sulfate in an amount of from 30 to 350 ppm by weight based on the fine glass powder.

9. The method for producing a supporting member for an electron gun according to claim 8, wherein the slurry is subjected to granulation treatment, followed by the molding.

* * * * *